US009654964B1

(12) United States Patent
Carames et al.

(10) Patent No.: US 9,654,964 B1
(45) Date of Patent: May 16, 2017

(54) IMS ROAMING SERVICE POLICIES

(71) Applicant: Verizon Patent and Licensing Inc., Arlington, VA (US)

(72) Inventors: Miguel Angel Carames, Argyle, TX (US); Jignesh Patel, Haltom City, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 15/075,843

(22) Filed: Mar. 21, 2016

(51) Int. Cl.
*H04W 4/00* (2009.01)
*H04W 8/06* (2009.01)
*H04L 29/06* (2006.01)
*H04W 12/06* (2009.01)
*H04W 4/22* (2009.01)

(52) U.S. Cl.
CPC ........... *H04W 8/06* (2013.01); *H04L 65/1006* (2013.01); *H04L 65/1046* (2013.01); *H04L 65/1069* (2013.01); *H04W 4/22* (2013.01); *H04W 12/06* (2013.01)

(58) Field of Classification Search
CPC ............. H04L 65/1016; H04L 65/1073; H04L 65/1006; H04L 65/1069; H04L 65/1046; H04L 65/80; H04L 65/105; H04L 65/1063; H04L 67/141; H04L 12/1407; H04L 63/08; H04L 63/0892; H04L 9/3234; H04L 12/5695; H04W 12/06; H04W 4/22; H04W 60/00; H04W 48/18; H04W 88/02; H04W 8/205; H04W 12/02; H04W 12/08; H04W 8/26; H04W 4/02; H04W 76/02; H04W 8/245

USPC ..... 370/328, 259; 455/411, 433, 435.1, 445, 455/404.2, 436, 446, 456.3, 466, 558, 455/410, 418, 432.1, 435.2, 414.1, 556.1; 709/227, 224

See application file for complete search history.

(56) References Cited

U.S. PATENT DOCUMENTS

2013/0301521 A1* 11/2013 Abdi ................. H04B 7/18513
370/316
2015/0327207 A1* 11/2015 Bharadwaj .............. H04W 8/04
455/435.2

* cited by examiner

*Primary Examiner* — Fred Casca

(57) ABSTRACT

A method including receiving, at a CSCF (Call Session Control Function) portion of a home network in which a mobile station is subscribed, an IMS (IP Multimedia Subsystem) registration request from the mobile station via a visited network to which the mobile station is attached; establishing an SIP (Session Initiation Protocol) session between the mobile station and the CSCF server in response to the received IMS registration request; receiving, at the CSCF server, a SIP INVITE message from the mobile station during the SIP session, wherein the SIP INVITE requests use of a service; obtaining an identifier for the visited network; obtaining, in response to receiving the SIP INVITE message, a first roaming policy based on the identifier for the visited network; determining whether the SIP INVITE message is acceptable based on the obtained first roaming policy and the service requested by the SIP INVITE message; and sending a response for the SIP INVITE message to the mobile station, wherein the response is based on the determination whether the SIP INVITE message is acceptable.

13 Claims, 7 Drawing Sheets

IMS ROAMING SERVICE POLICIES

BACKGROUND

Voice Over LTE (VoLTE) services have enjoyed increasing adoption by mobile network operators. As a result, there is a need for effective technical architectures for VoLTE roaming situations such as, but not limited to, when a subscriber of an operator in a first country is making use of mobile network services provided by a different operator in a different country. Initially, the 3GPP (The 3rd Generation Partnership Project) and the GSMA (GSM Association) specified a VoLTE roaming architecture called Local Break Out (LBO) (discussed in, for example, 3GPP TS 24.229), which is also referred to as RAVEL (Roaming Architecture for Voice over IMS with Local Breakout). Later, the GSMA endorsed a second VoLTE roaming architecture called S8 Home Routed (S8HR) (discussed in, for example, TR 23.749 for 3GPP Release 14).

Under the S8HR architecture, a visited LTE (Long Term Evolution) operator provides an LTE S8 interface to a subscriber's home public mobile network (HPMN, sometimes also referred to as an HPLMN, or home public land mobile network). All roaming calls (for voice or other services) are sent from the visited public mobile network (VPMN, sometimes also referred to as an VPLMN, or visited public land mobile network) to the HPMN as part of the S8 data payload. All IMS (IP Multimedia Subsystem) nodes are located at the HPMN, and all signaling and media traffic for the VoLTE roaming service go through the HPMN. Since IMS transactions are performed directly between a mobile station and a P-CSCF (Proxy-Call Session Control Function) in the HPMN, the VPMN becomes service-unaware at the IMS level. As a result, implementations of roaming policies by the VPMN can only be set up based upon IMSI (International Subscriber Mobile Identity, which includes MCC (mobile country code) and MNC (mobile network code) portions), APN (Access Point Name), and/or QCI (Quality of Service Class ID). However, such information is too limited to fully implement certain roaming agreements. Deep Packet Inspection (DPI) of IMS transactions by the VPMN cannot be relied upon to provide service awareness to the VPMN, as IMS transactions between a mobile station and a HPMN P-CSCF may be encrypted.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
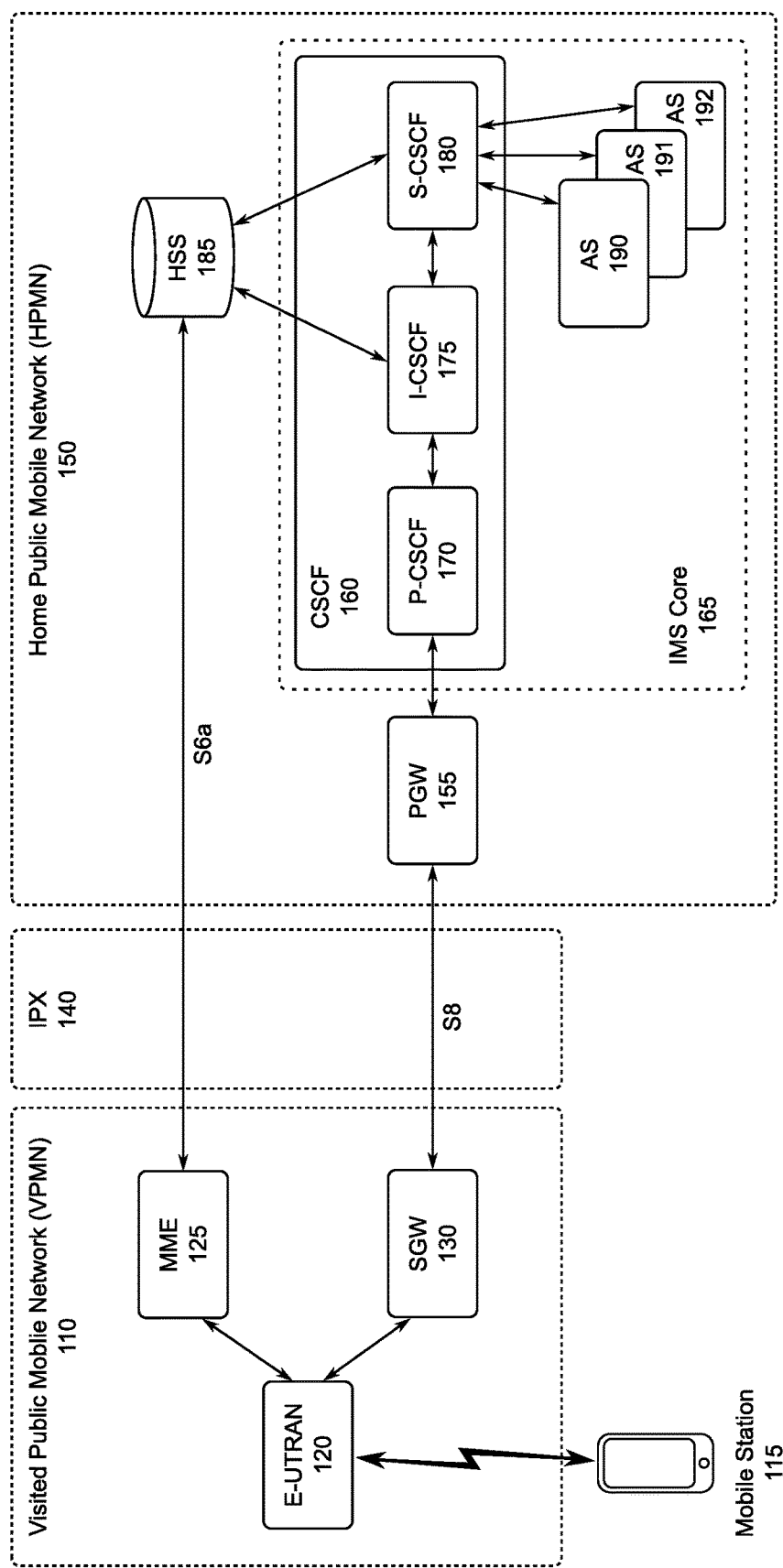
FIG. 1 illustrates an example of elements involved in a roaming mobile station subscribed to a home public mobile network (HPMN) 150 roaming on a visited public mobile network (VPMN).

FIG. 1 illustrates an example of elements involved in a roaming mobile station 115 subscribed to a home public mobile network (HPMN) 150 roaming on a visited public mobile network (VPMN) 110. This particular example involves a VoLTE terminal (mobile station 115) roaming according to the S8 Home Routed (S8HR) technical architecture. However, roaming profile-related techniques described in this disclosure may also be used in connection with other roaming architectures. It is noted that there are many other elements included in VPMN 110 and HPMN 150 which have not been illustrated for the convenience of discussion.

FIG. 1 includes roaming mobile station 115, VPMN 110, HPMN 150, and IPX (internetwork packet exchange) 140 for interconnection of, and transferring packets between, VPMN 110 and HPMN 150. In the example illustrated in FIG. 1, roaming has occurred because a user (or "subscriber") has taken mobile station 115 outside of HPMN 150 and is attempting to use it on VPMN 110. The HPMN 150 is the network serviced by the network provider in which the user has her subscription. VPMN 110 is the network into which the user has entered. Footprint control allows VPMN 110 to pick and choose when and where a roaming mobile station, such as roaming mobile station 115, can receive service on the VPMN 110 network.

Roaming mobile station 115 (which may also be referred to as "user equipment" or a "terminal") is attached to VPMN 110 via E-UTRAN (evolved universal terrestrial radio access network) 120 included in VPMN 110. It is noted that although FIG. 1 illustrates the use of E-UTRAN, other access network technologies and architectures may be used, including, but not limited to, GERAN, UMTS, and WiFi. As part of an attach procedure for attaching roaming mobile station 115 to VPMN 110, Diameter-based signaling (S6a) is used between MME (mobility management entity) 125 included in VPMN 110 and HSS (home subscriber server) 185 included in HPMN 150 via IPX DRA (Diameter Routing Agent) or direct connect. The S6a protocol enables transfer of profile and authentication data for authenticating/authorizing subscriber access between the HSS 185 of the HPMN 150 and the MME 125 of the VPMN 110. HSS 185 provides information used by VPMN 110 and roaming mobile station 115 to interact with HPMN 150.

Where S8HR is to be used for roaming between VPMN 110 and HPMN 150, SGW (Serving Gateway) 130 used by VPMN 110 for roaming mobile station 115 is configured not to access a PGW (PDN Gateway) included in VPMN 110 (not illustrated in FIG. 1). Instead, a GTP tunnel is established between SGW 130 and PGW 155 included in HPMN 150 via IPX or direct connect (S8). The roaming mobile station 115 acquires an IP address from the PGW 155 included in HPMN 150, and accesses services via PGW 155.

To access services while roaming on VPMN 110, roaming mobile station 115 performs an IMS SIP-based registration with a CSCF (Call Session Control Function) 160 portion of HPMN 150, which mediates access to SIP-based AS (Application Servers) 190, 191, and 192. CSCF 160 may include three types of servers (each of which may be referred to as a "CSCF server"): P-CSCF (Proxy Call Session Control Function) 170, I-CSCF (Interrogating Call Session Control Function) 175 (an optional portion of CSCF 160), and S-CSCF (Serving Call Session Control Function) 180. There may be more than one of each type of CSCF server included in HPMN 150, and roaming mobile station 115 may have a plurality of simultaneous SIP sessions established with CSCF 160 depending on which services are used by roaming mobile station 115. For example, there may be multiple S-CSCFs for load distribution and high availability reasons. CSCF 160 communicates with roaming mobile station via SIP messaging. P-CSCF 170 is the first IMS node encountered by roaming mobile station 115 when roaming mobile station 115 is trying to establish, for example, a VoLTE call, and all SIP messages pass through the P-CSCF 170. In a CSCF that includes an I-CSCF 175, I-CSCF 175 locates S-CSCF 180 for an LTE call. For example, during an IMS registration, roaming mobile device 115 sends a SIP REGISTER to P-CSCF 170, P-CSCF 170 forwards the SIP REGISTER message to I-CSCF 175, I-CSCF 175 consults HSS 185 using Diameter to locate an S-CSCF for the call. HSS 185 stores subscriber information such as, but not limited to, account information, account status, subscriber preferences, features subscribed to by the subscriber, and the subscriber's location. HSS 185 returns a list of available S-CSCF's with their capabilities, I-CSCF 175 matches the requirements of the call to the capabilities and choose the appropriate S-CSCF 180, and I-CSCF 175 forwards the SIP REGISTER message to S-CSCF 180. S-CSCF 180 is a SIP server, but performs session control as well, and sets up, controls, and maintains subscriber sessions. S-CSCF 180 uses Diameter interfaces to HSS 185 to download subscriber profiles and upload subscriber-to-S-CSCF associations. S-CSCF 180 determines which AS (application servers), such as AS 191, 192, and 193 illustrated in FIG. 1, SIP messages should be forwarded to in order to provide their services to mobile stations. Examples of AS 191, 192, and 193 include a TAS (Telephony Application Server) and MMTel (Multimedia Telephony). CSCF 160 and AS 191, 192, and 193 are included in what is sometimes referred to as the "IMS Core" 165 of the HPMN 150.

Figure 2:
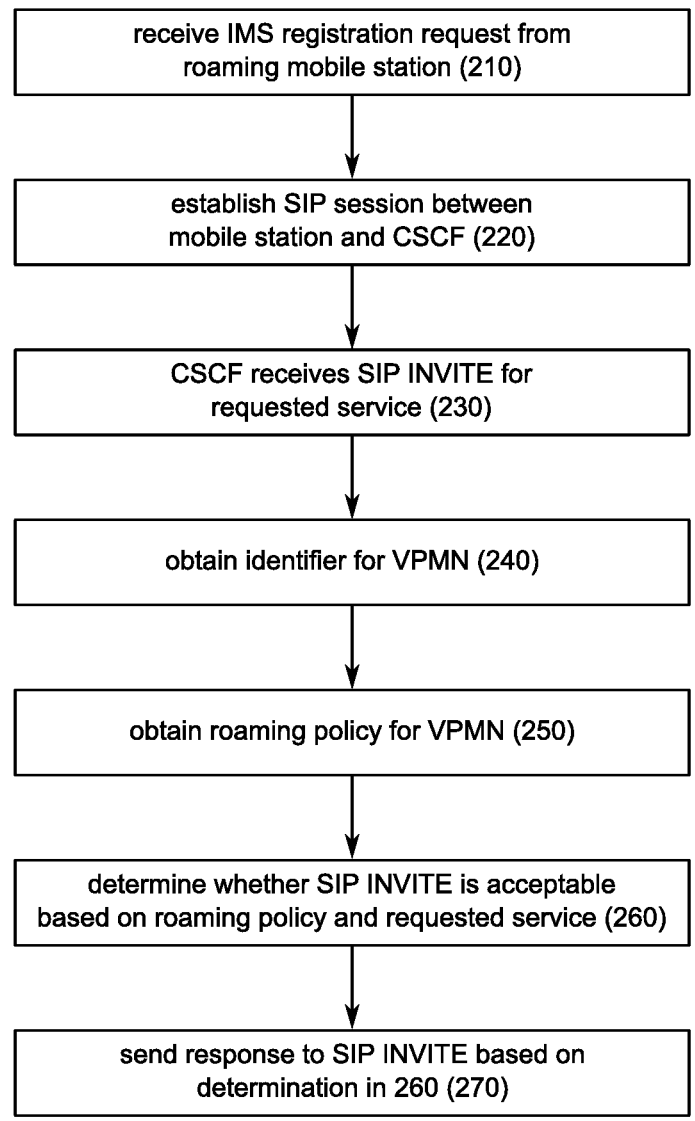
FIG. 2 illustrates an example process in which elements of an HPMN use a roaming profile or profiles to control whether a roaming station may make use of various services.

FIG. 2 illustrates an example process in which elements of an HPMN use a roaming profile or profiles to control whether a roaming station may make use of various services. At 210, CSCF 160 included in HPMN 150 receives an IMS registration request, as part of an IMS registration process, from roaming mobile station 115. The IMS registration request is sent via VPMN 110 to which roaming mobile station is attached. For example, roaming mobile station 115 may send a SIP REGISTER message to P-CSCF 170 via SGW 130 and PGW 155. At 220, CSCF 160 successfully concludes the IMS registration process, and establishes a SIP session between mobile station 115 and CSCF 160 in response to the IMS registration request received at 210.

At 230, CSCF 160 receives a SIP INVITE message from roaming mobile station 115 during the SIP session established at 220. The headers of the SIP INVITE message include information indicating which service roaming mobile station 115 is requesting to make use of. Examples of such services include, but are not limited to, VoLTE, SMS over IMS, and ViLTE (video over LTE). At 240, HPMN obtains an identifier for VPMN 110. For example, this identifier may be based on a P-Visited-Network-ID SIP header included in the SIP INVITE message, which provides an identity of a visited network in a roaming scenario, which may be used by, for example, P-CSCF 170 or AS 190 to obtain an identifier for VPMN 110. Other mechanisms may be used to obtain an identifier for VPMN 110, such as, but not limited to, information obtained by HPMN 150 during an attach procedure for roaming mobile station 115 with VPMN 110, or an originating IP address for the SIP INVITE message.

At 250, in response to receiving the SIP INVITE message, HPMN 150 obtains a roaming policy for VPMN 110 based on the obtained identifier for VPMN 110. As one example, CSCF 160 may store or otherwise implement roaming policies, such as in P-CSCF 170. As another example, AS 190 may store or otherwise implement roaming policies. As another example, another element of HPMN 150, such as HSS 185, may store or otherwise implement roaming policies, and this element may be use by other elements in HPMN 150, such as P-CSCF 170 and AS 190, to obtain roaming policies. A roaming policy might include, for example, a list identifier (such as US+Canada or Global), networks included in the roaming policy (which may be specified in the form of a PANI header as defined in 3GPP TS 24.229), and a list of services that are allowed or forbidden under the roaming policy (such as VoLTE, SMS over IMS, ViLTE, or other MMTel services).

At 260, HPMN 150 determines whether the SIP INVITE message is acceptable (and accordingly, whether a corresponding service request made by roaming mobile station 115 is acceptable) based on the roaming policy obtained at 250 and the service requested by the SIP INVITE message. For example, HPMN 150 may compare the requested service against a list of allowed/forbidden services included in the roaming policy. This may be performed by, for example, P-CSCF 170, S-CSCF 180, or AS 190. At 270, CSCF 160 sends a response for the SIP INVITE message based on the determination at 260. For example, if at 260 it is determined that the SIP INVITE message is not acceptable, CSCF 160 may send a reject message to roaming mobile station 115 in response to the SIP INVITE. If at 260 it is determined that the SIP INVITE (and its corresponding service request) is acceptable, CSCF 160 may continue a SIP dialog to begin use of the requested service by way of AS 190.

Figure 3:
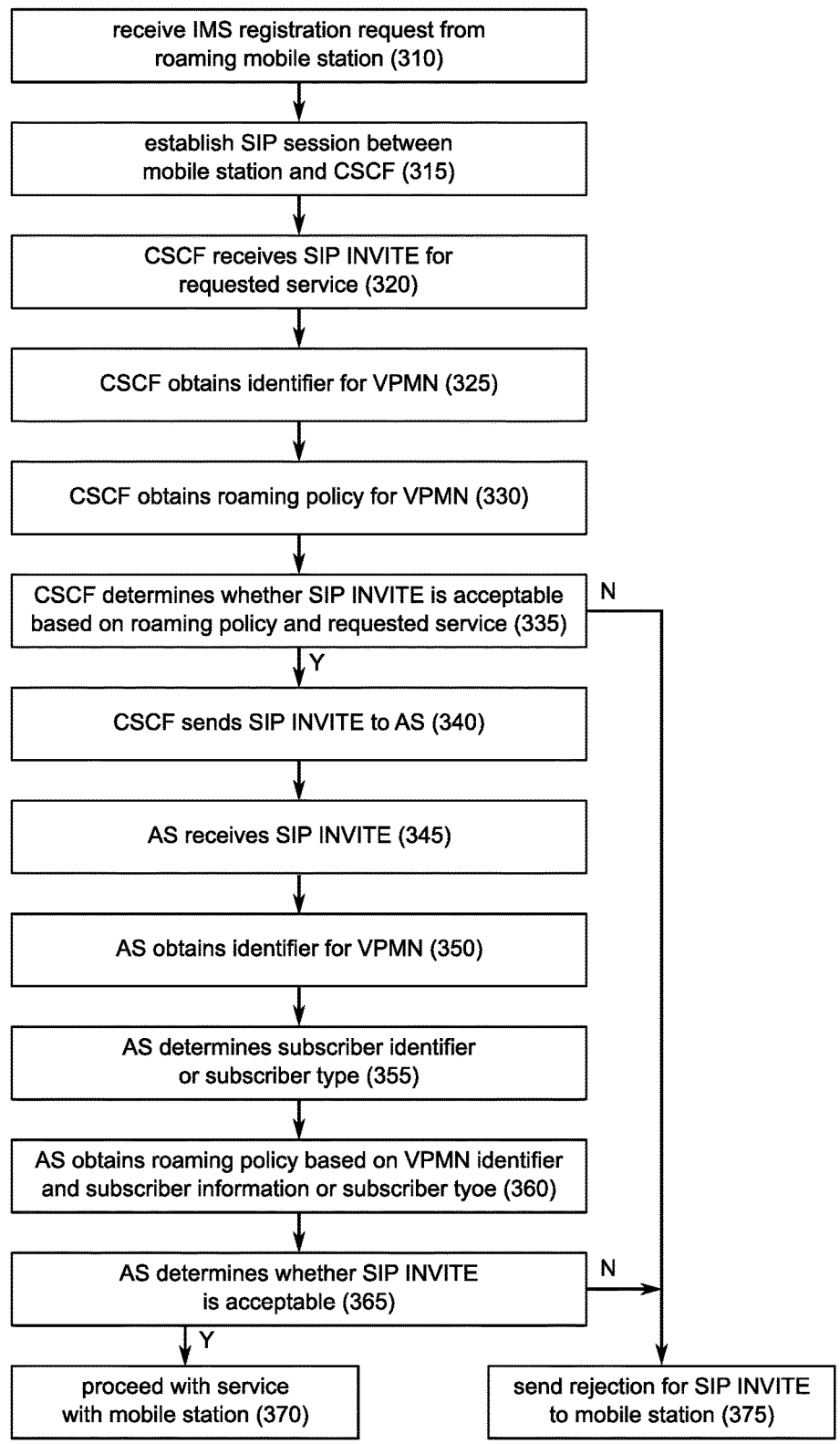
FIG. 3 illustrates an example process in which a CSCF and an AS each make use of roaming profiles to control whether a roaming station may make use of various services.

FIG. 3 illustrates an example process in which a CSCF and an AS each make use of roaming profiles to control whether a roaming station may make use of various services. At 310, CSCF 160 included in HPMN 150 receives an IMS registration request, as part of an IMS registration process, from roaming mobile station 115. The IMS registration request is sent via VPMN 110 to which roaming mobile station is attached. For example, roaming mobile station 115 may send a SIP REGISTER message to P-CSCF 170 via SGW 130 and PGW 155. At 315, CSCF 160 successfully concludes the IMS registration process, and establishes a SIP session between mobile station 115 and CSCF 160 in response to the IMS registration request received at 310.

At 320, CSCF 160 receives a first SIP INVITE message from roaming mobile station 115 during the SIP session established at 315. The headers of the first SIP INVITE message include information indicating which service roaming mobile station 115 is requesting to make use of. At 325, CSCF 160 obtains an identifier for VPMN 110. For example, this identifier may be based on a P-Visited-Network-ID SIP header included in the first SIP INVITE message, which may be used by, for example, P-CSCF 170 or S-CSCF 180 to obtain an identifier for VPMN 110. Other mechanisms may be used to obtain an identifier for VPMN 110, such as, but not limited to, information obtained by HPMN 150 during an attach procedure for roaming mobile station 115 with VPMN 110, or an originating IP address for the first SIP INVITE message.

At 330, in response to receiving the first SIP INVITE message, CSCF 160 obtains a first roaming policy for VPMN 110 based on the identifier for VPMN 110 obtained at 325. As one example, CSCF 160 may store or otherwise implement roaming policies in P-CSCF 170 or S-CSCF 180. As another example, another element of HPMN 150, such as HSS 185, may store or otherwise implement roaming policies, and this element may be use by other elements in HPMN 150, such as P-CSCF 170 and S-CSCF 180, to obtain roaming policies. A roaming policy might include, for example, a list identifier (such as US+Canada or Global), networks included in the roaming policy (which may be specified in the form of a PANI header as defined in 3GPP TS 24.229), and a list of services that are allowed or forbidden under the roaming policy (such as VoLTE, SMS over IMS, ViLTE, or other MMTel services).

At 335, CSCF 160 determines whether the first SIP INVITE message is acceptable (and accordingly, whether a corresponding service request made by roaming mobile station 115 is acceptable) based on the first roaming policy obtained at 330 and the service requested by the first SIP INVITE message. For example, CSCF 160 may compare the requested service against a list of allowed/forbidden services included in the first roaming policy. This may be performed by, for example, P-CSCF 170 or S-CSCF 180. If CSCF 160 determines the first SIP INVITE message is not acceptable ('N'), the process proceeds to 375 where the first SIP INVITE message is rejected. If CSCF 160 determines the first SIP INVITE is acceptable ('Y'), the process continues to 340.

At 340, CSCF 160 sends a second SIP INVITE message, based on the first SIP INVITE message, to AS 190 (subsequent to S-CSCF 180 having determined that AS 190 is the appropriate AS to handle the service request from roaming mobile station 115). This may be performed by simply forwarding the first SIP INVITE message to AS 190. However, in some examples the first SIP INVITE message may be modified, such as by adding, removing, and/or modifying SIP headers in the first SIP INVITE message, or modifying other portions of the first SIP INVITE message, to produce the second SIP INVITE message for AS 190. At 345, AS 190 receives the second SIP INVITE message from CSCF 160. At 350, AS 190 obtains an identifier for VPMN 110. For example, this identifier may be based on a P-Visited-Network-ID SIP header included in the second SIP INVITE message, which may be used by AS 190 obtain an identifier for VPMN 110. Other mechanisms may be used to obtain an identifier for VPMN 110, such as, but not limited to, information obtained by HPMN 150 during an attach procedure for roaming mobile station 115 with VPMN 110, or an originating IP address for the first SIP INVITE message. The identifier may be different than the identifier obtained by CSCF 160 at 325, and/or the identifier be obtained by a different technique than the technique used by CSCF 160 at 325.

At 355, AS 190 determines a subscriber identifier or a subscriber type for the roaming mobile station 115. Some CSCF servers, such as P-CSCF 170, may architecturally not be subscriber aware. However, AS 190 is subscriber aware. For example, AS 190 may obtain subscriber information via Diameter from HSS 185. As another example, S-CSCF 180 may be configured to obtain the subscriber identifier or subscriber type from HSS 185 and add such information to the second SIP INVITE message, such as in an additional SIP header. Examples of a subscriber type might include, for example, whether a subscriber is using a pre-paid subscription or a postpaid subscription, as different roaming policies may be in place among subscriber types. For example, a subscriber with a pre-paid subscription may not be allowed to utilize ViLTE services while roaming.

At 360, AS 190 obtains a second roaming policy based on the identifier for VPMN 110 obtained at 350 and the subscriber identifier or subscriber type obtained at 355. As one example, AS 190 may store or otherwise implement roaming policies. As another example, another element of HPMN 150, such as HSS 185, may store or otherwise implement roaming policies, and this element may be use by other elements in HPMN 150, such as AS 190, to obtain roaming policies. A roaming policy might include, for example, a list identifier (such as US+Canada or Global), networks included in the roaming policy (which may be specified in the form of a PANI header as defined in 3GPP TS 24.229), and a list of services that are allowed or forbidden under the roaming policy (such as VoLTE, SMS over IMS, ViLTE, or other MMTel services).

At 365, AS 190 determines whether the second SIP INVITE message is acceptable (and accordingly, whether the first SIP INVITE and a corresponding service request made by roaming mobile station 115 are acceptable as well) based on the second roaming policy obtained at 360. In some examples, this determination may further be based on the service being requested by the roaming mobile station 115. In some examples, AS 190 may determine the service being requested by roaming mobile station 115, for example, by information included in the second SIP INVITE message. Also, the requested service may be implicitly determined, such as if AS 190 is only used for a single service. If AS 190 determines the second SIP INVITE message is not acceptable ('N'), the process proceeds to 375 where a rejection of the first SIP INVITE message is sent to roaming mobile station 115 as a response to the first SIP INVITE message. This may be performed by AS 190 sending a rejection to the second SIP INVITE message to CSCF 160, which then may forward the rejection to roaming mobile station 115 or send a rejection to roaming mobile station 115 in response to receiving the rejection from AS 190. If AS 190 determines the second SIP INVITE message is acceptable ('Y'), AS may continue a SIP dialog with roaming mobile station 115 to proceed with providing the requested service to roaming mobile station 115.

Figure 4:
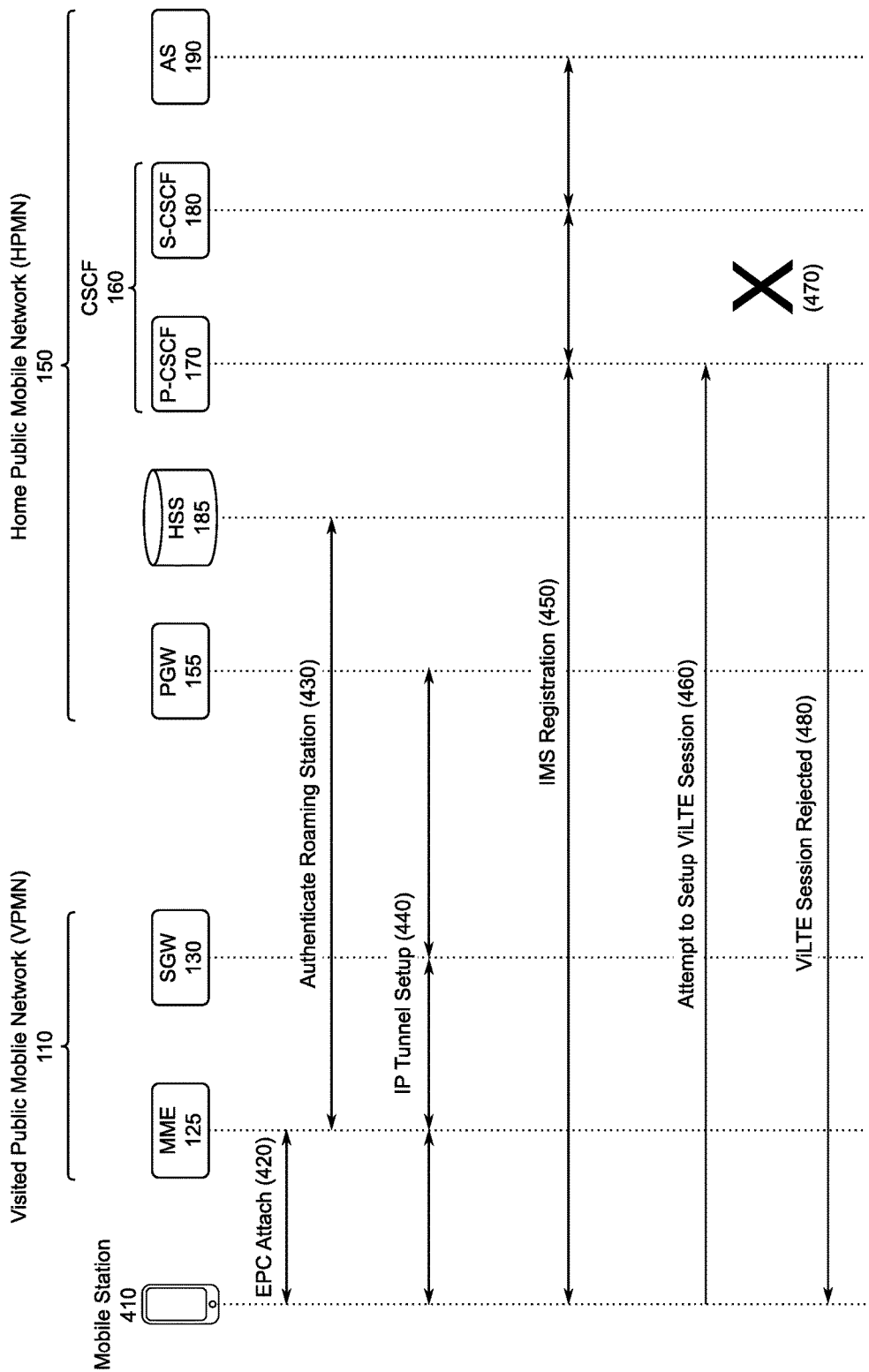
FIG. 4 illustrates an example in which an attempt at using a ViLTE (Video over LTE) service while roaming is rejected by a CSCF portion of a home network.

FIG. 4 illustrates an example in which an attempt at using a ViLTE (Video over LTE) service while roaming is rejected by a CSCF portion of a home network. For the purpose of the example in FIG. 4, ViLTE is not included in a roaming agreement between the operators of VPMN 110 and HPMN 150. At 420, roaming mobile station 410 initiates an EPC attach procedure with VPMN 110. At 430, in response to the initiation of the EPC attach procedure at 420, MME 425 authenticates roaming mobile station 410 against its home HSS 185 included in HPMN 150. HSS 185 provides a list of authorized EPC services to MME 125, such as, but not limited to, APNs and QoS (quality of service) per APN. At 440, roaming mobile station 410 and VPMN 110 set up an IP tunnel via PDN setup. During this process, it is possible for VPMN 110 to enforce some aspects of certain roaming agreements based on a roaming policy that may have been received from HSS 185 or obtained based on information provided by HSS 185. For example, VPMN 110 can reject the IP tunnel setup based on roaming mobile station 410 requesting QCIs that are not part of a roaming agreement between VPMN 110 and HPMN 150. Also, VPMN 110 may base such a rejection on APN or IMSI information (including MCC and/or MNC information). However, where an S8HR roaming architecture is used for roaming between VPMN 110 and HPMN 150, VPMN 110 lacks visibility into IMS services requested by roaming mobile station 410 that might be used to enforce other aspects of a roaming agreement. At 450, roaming mobile station 410 performs an IMS registration process with CSCF 160, starting with sending an SIP REGISTER message to P-CSCF 160, which is forwarded to S-CSCF 160, and may also be forwarded to AS 190. It is assumed in this example that the EPC attach at 420, the authentication of roaming mobile station 410 at 430, the IP tunnel setup at 440, and the IMS registration 450 complete successfully, and as a result an SIP session has been established between roaming mobile station 410 and CSCF 160 by which roaming mobile station 410 may request the use of IMS services.

At 460, roaming mobile station 410 attempts to set up a ViLTE session. This begins with roaming mobile station 410 sending an SIP INVITE request to CSCF 160 via P-CSCF 170. This leads to HPMN 150 performing the processes illustrated at 210-260 in FIG. 2, and discussed above. In this particular example, the roaming policy obtained by CSCF 160 indicates that ViLTE is not allowed for any roaming mobile stations from HPMN 160 that are roaming on VPMN 110. At 470, based on roaming mobile device 410 having requested ViLTE service and the obtained roaming policy, CSCF 160 determines that the SIP INVITE message (and roaming mobile station 410's associated request for service) is not acceptable. For example, P-CSCF 170 may extract an identifier for VPMN 110 from the SIP INVITE message, compare the identifier against roaming policies stored in P-CSCF 170 or elsewhere in HPMN 150, and determine the ViLTE service requested by roaming mobile station 410 is not allowable under the agreements in place between VPMN 110 and HPMN 150. As a result, at 480, CSCF 160 sends a rejection to roaming mobile station 410 in response to the attempt to set up the session at 460.

Figure 5:
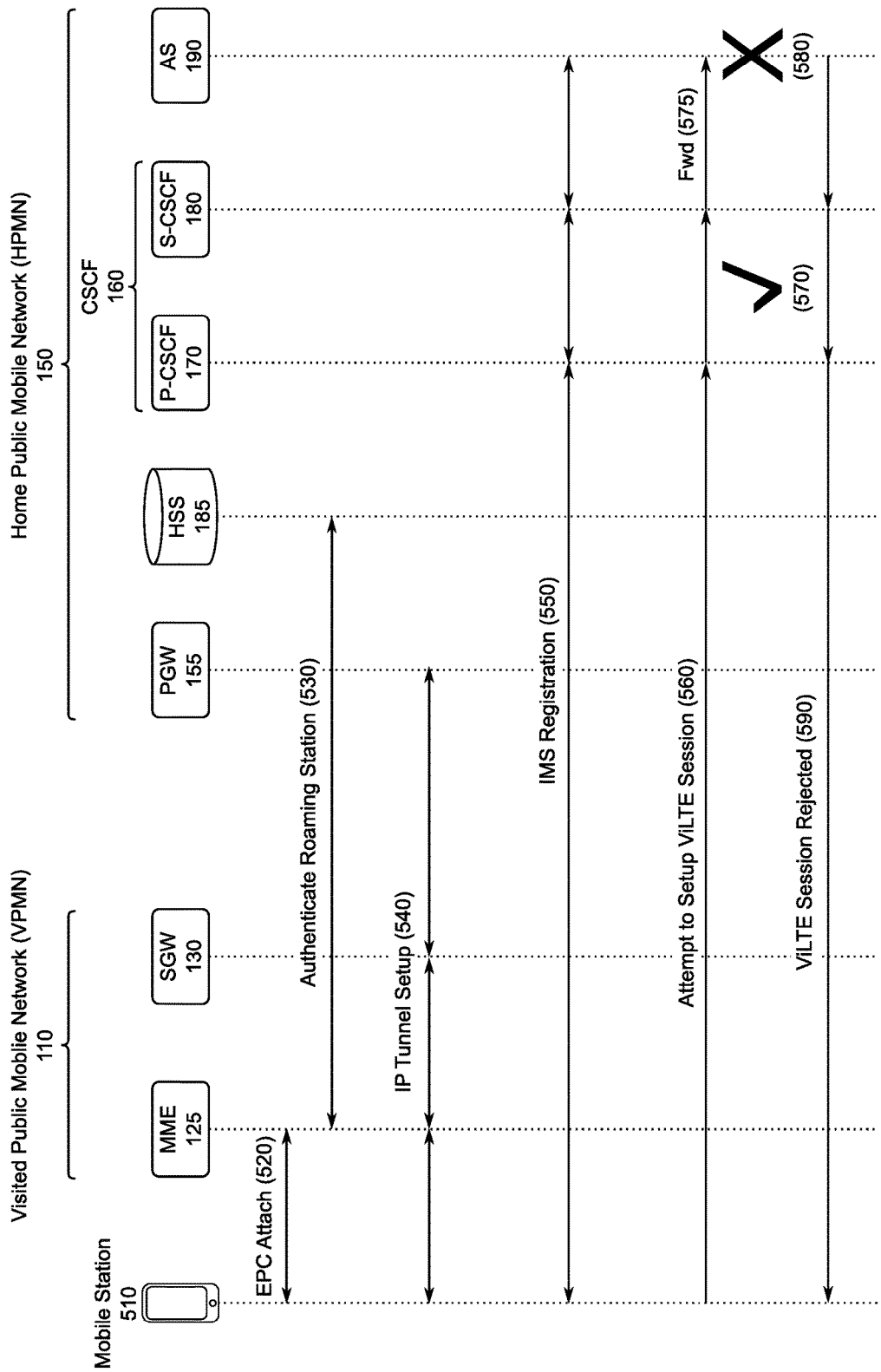
FIG. 5 illustrates an example in which an attempt at using a ViLTE service while roaming is rejected by an AS (Application Server).

FIG. 5 illustrates an example in which an attempt at using a ViLTE service while roaming is rejected by an AS. For the purpose of the example in FIG. 5, ViLTE is included in a roaming agreement between the operators of VPMN 110 and HPMN 150, but is not allowed for pre-paid subscribers of HPMN 150, and roaming mobile station 510 is operating under a pre-paid subscription. 520, 530, 540, and 550 proceed much the same as described for 420, 430, 440, and 450 in FIG. 4, and as a result an SIP session has been established between roaming mobile station 510 and CSCF 160 by which roaming mobile station 510 may request the use of IMS services.

At 560, roaming mobile station 510 attempts to set up a ViLTE session. This begins with roaming mobile station 510 sending an SIP INVITE request to CSCF 160 via P-CSCF 170. This leads to HPMN 150 performing the processes illustrated at 310-335 in FIG. 3, and discussed above. In this particular example, the roaming policy obtained by CSCF 160 indicates that ViLTE is allowed for mobile stations from HPMN 160 that are roaming on VPMN 110. At 570, based on roaming mobile device 510 having requested ViLTE service and the obtained roaming policy, CSCF 160 determines that the SIP INVITE message (and roaming mobile station 510's associated request for service) is acceptable. For example, P-CSCF 170 may extract an identifier for VPMN 110 from the SIP INVITE message, compare the identifier against roaming policies stored in P-CSCF 170 or elsewhere in HPMN 150, and determine the ViLTE service requested by roaming mobile station 510 is allowable under the agreements in place between VPMN 110 and HPMN 150. As a result, at 575, CSCF 160 forwards the SIP INVITE message, or another SIP INVITE message based on the original SIP INVITE message, to AP 190.

This leads to HPMN 150 performing the processes illustrated at 345-365 in FIG. 3, and discussed above. In this particular example, the roaming policy obtained by AS 190 indicates that ViLTE is allowed for mobile stations from HPMN 160 that are roaming on VPMN 110, except that pre-paid subscribers are not allowed to perform ViLTE roaming. In this example, AS 190 obtains a subscriber type for roaming mobile station 510 that indicates that roaming mobile station 510 is on a pre-paid subscription with HPMN 150. Based on this obtained subscriber type, at 580, AS 190 determines that the SIP INVITE message (and roaming mobile station 510's associated request for service) is not acceptable. Based on this determination, at 590, AS 190 sends a rejection to CSCF 160, and CSCF 160 sends a rejection to roaming mobile station 510 in response to the attempt to set up the session at 560.

Figure 6:
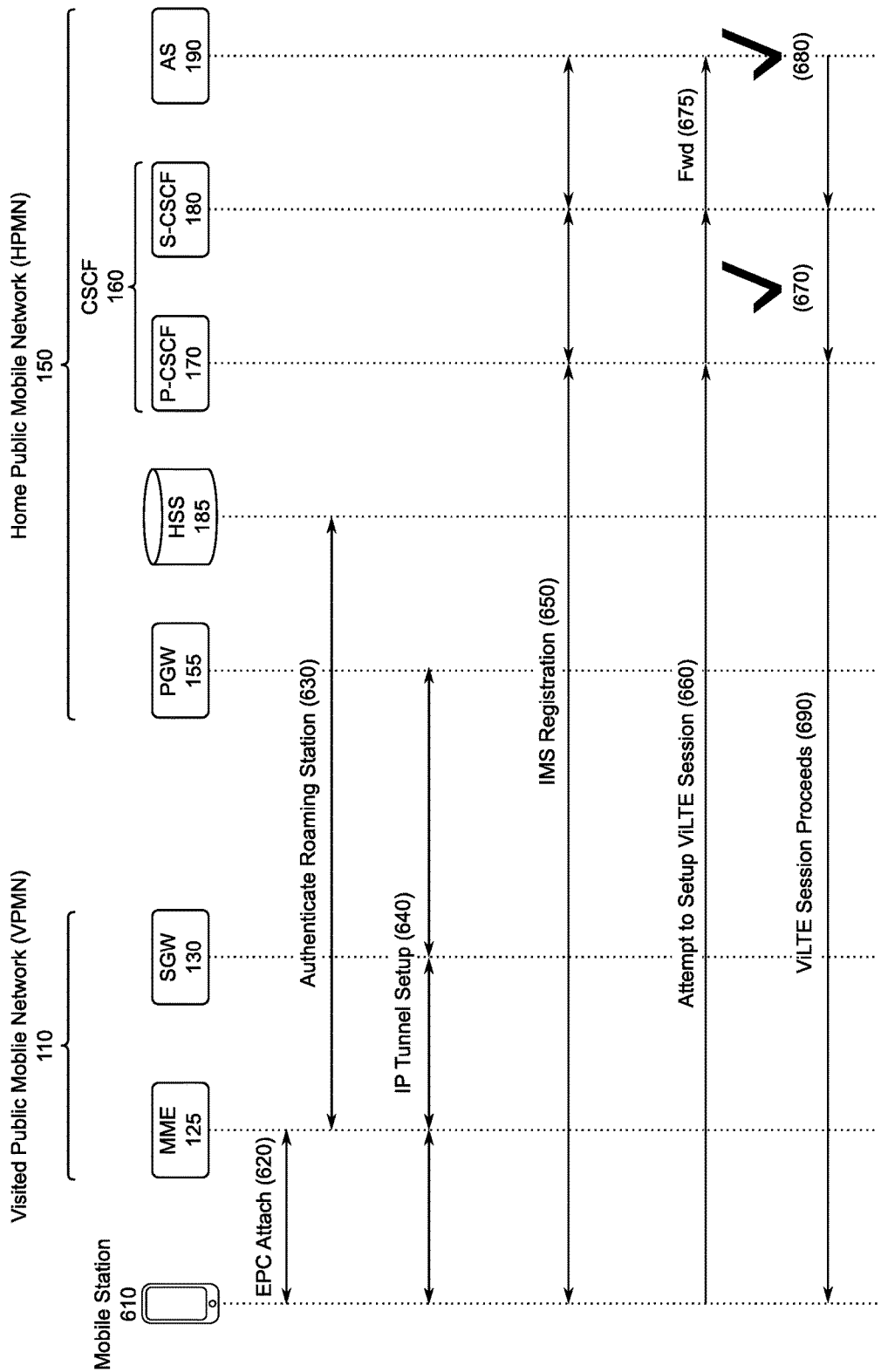
FIG. 6 illustrates an example in which an attempt at using a ViLTE service while roaming is successful.

FIG. 6 illustrates an example in which an attempt at using a ViLTE service while roaming is successful. For the purpose of the example in FIG. 6, ViLTE is included in a roaming agreement between the operators of VPMN 110 and HPMN 150, but is not allowed for pre-paid subscribers of HPMN 150, and roaming mobile station 510 is operating under a post-paid (rather than a pre-paid) subscription. 620, 630, 640, and 650 proceed much the same as described for 420, 430, 440, and 450 in FIG. 4, and as a result an SIP session has been established between roaming mobile station 610 and CSCF 160 by which roaming mobile station 610 may request the use of IMS services. Also, 660, 670, and 675 proceed much the same as described for 560, 570, and 575 in FIG. 5, and as a result AS 190 determines whether the SIP INVITE message is acceptable.

This leads to HPMN 150 performing the processes illustrated at 345-365 in FIG. 3, and discussed above. In this particular example, the roaming policy obtained by AS 190 indicates that ViLTE is allowed for mobile stations from HPMN 160 that are roaming on VPMN 110, except that pre-paid subscribers are not allowed to perform ViLTE roaming. In this example, AS 190 obtains a subscriber type for roaming mobile station 610 that indicates that roaming mobile station 610 is on a post-paid subscription (not a pre-paid subscription) with HPMN 150. Based on this obtained subscriber type, at 680, AS 190 determines that the SIP INVITE message (and roaming mobile station 510's associated request for service) is acceptable. Based on this determination, at 690, AS 190 and CSCF 160 proceed with the ViLTE session requested by roaming mobile station 610.

Figure 7:
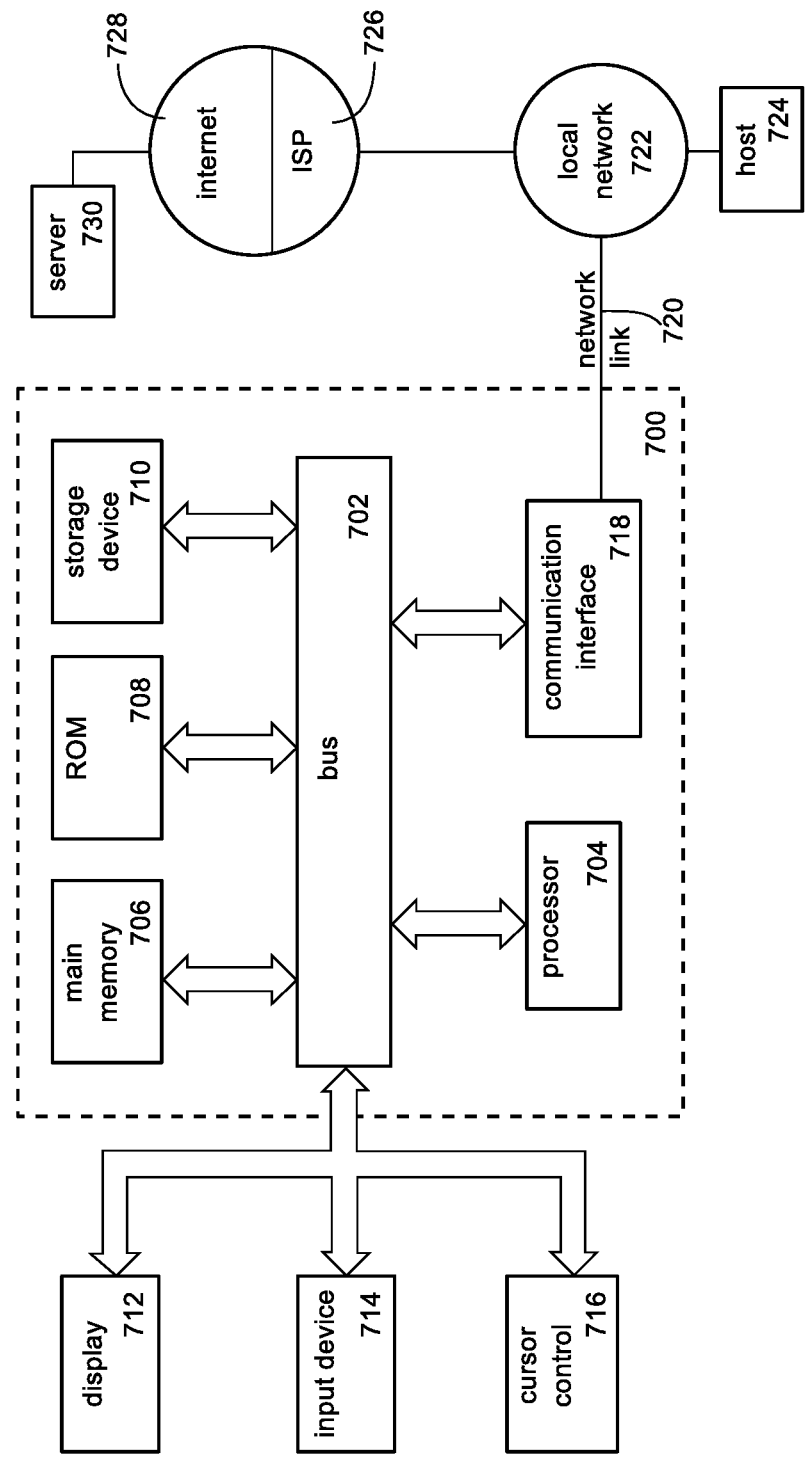
FIG. 7 is a block diagram that illustrates a computer system 700 upon which aspects of this disclosure may be implemented.

FIG. 7 is a block diagram that illustrates a computer system 700 upon which aspects of this disclosure may be implemented, such as, but not limited to mobile stations 115, 410, 510, and 610, MME 125, SGW 130, PGW 155, CSCF 160, P-CSCF 170, I-CSCF 175, S-CSCF 180, HSS 185, and AS 190, 191, and 192. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT) or liquid crystal display (LCD), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. Another type of user input device is a touchscreen, which generally combines display 712 with hardware that registers touches upon display 712.

This disclosure is related to the use of computer systems such as computer system 700 for implementing the techniques described herein. In some examples, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In some examples, hardwired circuitry may be used in place of or in combination with software instructions to implement the various aspects of this disclosure. Thus, implementations are not limited to any specific combination of hardware circuitry and software.

The term "machine-readable medium" as used herein refers to any medium that participates in providing data that causes a machine to operation in a specific fashion. In some examples implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method comprising:
   receiving, by a processor at a CSCF (Call Session Control Function) portion of a home network in which a mobile station is subscribed, an IMS (IP Multimedia Subsystem) registration request from the mobile station via a visited network to which the mobile station is attached;
   establishing an SIP (Session Initiation Protocol) session between the mobile station and the CSCF in response to the received IMS registration request;
   receiving, at the CSCF, a first SIP INVITE message from the mobile station during the SIP session, wherein the first SIP INVITE requests use of a service;
   obtaining an identifier for the visited network;
   obtaining, in response to receiving the first SIP INVITE message, a first roaming policy based on the identifier for the visited network;
   determining whether the first SIP INVITE message is acceptable based on the obtained first roaming policy and the service requested by the first SIP INVITE message;
   sending a response for the first SIP INVITE message to the mobile station, wherein the response is based on the determination whether the first SIP INVITE message is acceptable;
   obtaining, at the CSCF and in response to receiving the first SIP INVITE message, a second roaming policy based on the identifier for the visited network;
   determining, by the CSCF, that the first SIP INVITE message is acceptable based on the second roaming policy;
   sending, in response to the determination that the first SIP INVITE message is acceptable based on the second roaming policy, a second SIP INVITE message, based on the first SIP INVITE message, from the CSCF to an AS (Application Server) included in the home network;
   determining, in response to receiving the second SIP INVITE message at the AS, a subscriber identifier or subscriber type for the mobile station; and
   obtaining the first roaming policy based on the identifier for the visited network and the determined subscriber identifier or subscriber type;
   wherein the determining whether the first SIP INVITE message is acceptable based on the obtained first roaming policy is performed by the AS.

2. The method of claim 1, wherein the determining whether the first SIP INVITE message is acceptable based on the second roaming policy is performed by a P-CSCF (Proxy-CSCF) SIP proxy server included in the CSCF.

3. The method of claim 1, wherein the AS is a TAS (Telephony Application Server).

4. The method of claim 1, wherein the mobile station is a VoLTE (Voice over LTE) terminal.

5. The method of claim 1, further comprising obtaining the identifier for the visited network based on information included in the first SIP INVITE message.

6. The method of claim 1, wherein the roaming profile allows use of a VoLTE (Voice over LTE) server and an SMS over IMS service, and disallows use of a ViLTE (Video over LTE) service.

7. The method of claim 1, wherein communication between the visited network and the home network for mobile stations of the home network is performed according to S8HR (S8 Home Routing).

8. A system comprising:
   a processor configured to provide a CSCF (Call Session Control Function) portion of a home network in which a mobile station is subscribed, wherein the CSCF is configured to:
   receive an IMS (IP Multimedia Subsystem) registration request from the mobile station via a visited network to which the mobile station is attached;

establish an SIP (Session Initiation Protocol) session with the mobile station and in response to the received IMS registration request;

receive a first SIP INVITE message from the mobile station during the SIP session, wherein the first SIP INVITE requests use of a service;

obtain a first identifier for the visited network;

obtain, in response to receiving the first SIP INVITE message, a first roaming policy based on the first identifier for the visited network;

determine whether the first SIP INVITE message is acceptable based on the obtained first roaming policy and the service requested by the first SIP INVITE message; and send a first response for the first SIP INVITE message to the mobile station, wherein the first response is based on the determination whether the first SIP INVITE message is acceptable; and a processor configured to provide an AS (Application Server) included in the home network and configured to:

receive a second SIP INVITE message from the CSCF;

determine, in response to receiving the second SIP INVITE message, a subscriber identifier or subscriber type for the mobile station;

obtain a second identifier for the visited network;

obtain a second roaming policy based on the second identifier for the visited network and the determined subscriber identifier or subscriber type;

determine whether the second SIP INVITE message is acceptable based on the obtained second roaming policy and the service requested by the first SIP INVITE message; and send a second response for the second SIP INVITE message to the CSCF, wherein:

the second response is based on the determination whether the second SIP INVITE message is acceptable, the CSCF is further configured to send the second SIP INVITE message, based on and in response to the first SIP INVITE message, to the AS, and the first response is further based on the second response.

9. The system of claim 8, wherein:

the CSCF includes a P-CSCF (Proxy-CSCF) SIP proxy server; and the determining whether the first SIP INVITE message is acceptable is performed by the P-CSCF SIP proxy server.

10. The system of claim 8, wherein the CSCF is further configured to obtain the first identifier for the visited network based on information included in the first SIP INVITE message.

11. The system of claim 8, wherein the first roaming profile allows use of a VoLTE (Voice over LTE) server and an SMS over IMS service, and disallows use of a ViLTE (Video over LTE) service.

12. The system of claim 8, wherein the AS is a TAS (Telephony Application Server).

13. The system of claim 8, wherein the CSCF is further configured to communicate with the visited network according to S8HR (S8 Home Routing).

* * * * *